United States Patent
Smith et al.

(10) Patent No.: US 9,421,939 B2
(45) Date of Patent: Aug. 23, 2016

(54) BASE-MOUNTED AIRBAG INFLATOR AND RELATED METHODS AND SYSTEMS

(71) Applicant: Autoliv ASP, Inc., Ogden, UT (US)

(72) Inventors: Bradley W. Smith, Plain City, UT (US); Michael P. Jordan, South Weber, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 5 days.

(21) Appl. No.: 14/300,997

(22) Filed: Jun. 10, 2014

(65) Prior Publication Data
US 2015/0353046 A1 Dec. 10, 2015

(51) Int. Cl.
*B60R 21/217* (2011.01)

(52) U.S. Cl.
CPC .................................. *B60R 21/217* (2013.01)

(58) Field of Classification Search
CPC .................................................... B60R 21/217
USPC .............. 280/728.2, 728.1, 730.1, 731, 732, 280/743.1
See application file for complete search history.

(56) References Cited

U.S. PATENT DOCUMENTS

| | | | |
|---|---|---|---|
| 3,772,062 A | 11/1973 | Shur et al. | |
| 3,843,010 A | 10/1974 | Morse et al. | |
| 3,874,544 A | 4/1975 | Harmon | |
| 3,969,812 A | 7/1976 | Beck | |
| 4,640,312 A | 2/1987 | Patell et al. | |
| 4,835,975 A | 6/1989 | Windecker | |
| 4,865,210 A | 9/1989 | Brainard, II | |
| 4,913,461 A | 4/1990 | Cuevas | |
| 4,982,870 A | 1/1991 | Van Loon | |
| 5,028,070 A | 7/1991 | Bender | |
| 5,062,367 A | 11/1991 | Hayashi et al. | |
| 5,100,171 A | 3/1992 | Faigle et al. | |
| 5,264,059 A | 11/1993 | Jacaruso et al. | |
| 5,277,442 A * | 1/1994 | Cuevas | 280/731 |
| 5,340,148 A | 8/1994 | Faigle et al. | |
| 5,382,046 A * | 1/1995 | Cuevas | 280/728.2 |
| 5,388,858 A * | 2/1995 | Cuevas | 280/728.2 |
| 5,409,256 A * | 4/1995 | Gordon | B60R 21/2035 280/728.2 |
| 5,423,568 A | 6/1995 | Zushi et al. | |
| 5,492,364 A | 2/1996 | Anderson et al. | |

(Continued)

FOREIGN PATENT DOCUMENTS

DE  102009006077  7/2010

OTHER PUBLICATIONS

Concise Explanation of Relevance of DE102009006077.

*Primary Examiner* — Darlene P Condra
(74) *Attorney, Agent, or Firm* — Phillips Ryther & Winchester; Matthew D. Thayne

(57) ABSTRACT

Apparatus and systems for coupling a base of an airbag inflator with a housing, such as an airbag module housing or an adapter housing configured to be coupled with an airbag module housing. In some embodiments, a vehicle airbag assembly may comprise a housing comprising an opening and a plurality of notches. An inflator comprising an inflator base may be received in the opening such that at least a portion of the inflator base extends out of the opening. A plurality of tabs may be positioned about the inflator base. The plurality of tabs may be configured to be received in the plurality of notches and misaligned with the plurality of notches by rotating the plurality of notches with respect to at least one component of the vehicle airbag assembly, such as a retaining washer, to prevent the inflator base from being withdrawn from the opening.

17 Claims, 6 Drawing Sheets

(56) References Cited

U.S. PATENT DOCUMENTS

| | | | |
|---|---|---|---|
| 5,501,484 A * | 3/1996 | Saderholm et al. | 280/728.2 |
| 5,547,213 A | 8/1996 | Lang et al. | |
| 5,613,700 A | 3/1997 | Hiramitsu et al. | |
| 5,671,946 A | 9/1997 | Whalen et al. | |
| 5,743,558 A * | 4/1998 | Seymour | 280/739 |
| 5,791,682 A * | 8/1998 | Hiramitsu et al. | 280/728.2 |
| 5,884,936 A * | 3/1999 | Matsu et al. | 280/728.2 |
| 6,149,184 A * | 11/2000 | Ennis et al. | 280/728.2 |
| 6,183,003 B1 * | 2/2001 | Matsuhashi | B60R 21/2035 280/728.2 |
| 6,328,332 B1 | 12/2001 | Schutz | |
| 6,361,064 B1 * | 3/2002 | Hopf et al. | 280/728.1 |
| RE38,494 E | 4/2004 | Kirker et al. | |
| 6,802,193 B1 * | 10/2004 | Long | B60R 25/0222 292/352 |
| 7,147,124 B2 | 12/2006 | Minta et al. | |
| 7,175,894 B2 | 2/2007 | Nakamura | |
| 7,293,794 B2 * | 11/2007 | Clarke | B60R 21/2035 280/731 |
| 7,516,983 B2 | 4/2009 | Suehiro et al. | |
| 7,597,353 B2 | 10/2009 | Smith et al. | |
| 7,637,528 B2 * | 12/2009 | Shimazaki et al. | 280/728.2 |
| 8,297,653 B2 | 10/2012 | Smith | |
| 2004/0061315 A1 * | 4/2004 | Schneider | B60R 21/217 280/728.2 |
| 2004/0235378 A1 | 11/2004 | Byma et al. | |
| 2005/0225064 A1 | 10/2005 | Suehiro et al. | |
| 2006/0060325 A1 | 3/2006 | Gordon et al. | |
| 2006/0267322 A1 | 11/2006 | Eckelberg | |
| 2007/0125488 A1 | 6/2007 | Bisson et al. | |
| 2009/0051146 A1 * | 2/2009 | Bosch | 280/728.2 |
| 2011/0169254 A1 * | 7/2011 | Bert | 280/741 |
| 2012/0217728 A1 * | 8/2012 | Jackson et al. | 280/728.2 |
| 2012/0234839 A1 | 9/2012 | Smith et al. | |
| 2012/0235392 A1 | 9/2012 | Smith | |
| 2014/0144343 A1 | 5/2014 | Smith et al. | |

* cited by examiner

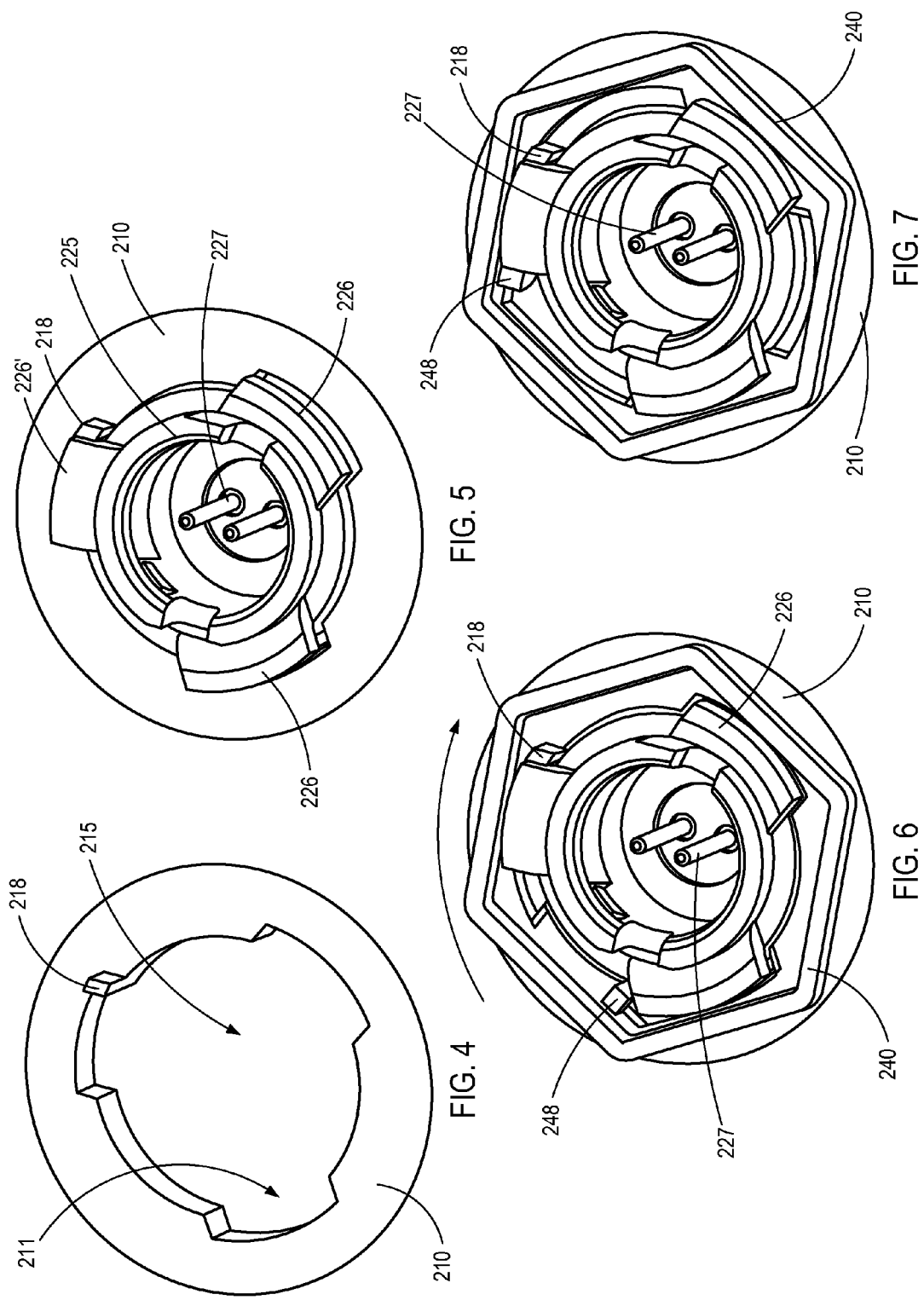

BASE-MOUNTED AIRBAG INFLATOR AND RELATED METHODS AND SYSTEMS

SUMMARY

Apparatus and systems are disclosed herein for coupling an inflator base of an airbag inflator with a housing, such as an airbag module housing or an adapter housing configured to be coupled with an airbag module housing and/or another component of a vehicle airbag system. Some embodiments may be particularly suited to coupling an inflator comprising a composite fiber overwrap with such a housing.

In one more particular example of a vehicle airbag assembly according to certain embodiments, the assembly may comprise a housing comprising a housing opening and an inflator comprising an inflator base configured to be received in the housing opening. The inflator base may be configured to extend at least partially through the housing opening such that at least a portion of the inflator base extends out of the housing opening.

The assembly may further comprise a retaining washer comprising a retaining washer opening. The retaining washer may be configured to be positioned such that at least a portion of the inflator base extends through the retaining washer opening and such that at least a portion of the retaining washer contacts the housing. The retaining washer may be configured to be rotated with respect to the inflator base to mount the inflator to the housing and to prevent the inflator base from being withdrawn from the housing opening.

In some embodiments, the retaining washer may comprise a plurality of retaining washer notches configured to allow the retaining washer to be positioned over the plurality of tabs. The retaining washer may further comprise a plurality of mounting portions positioned in between the plurality of retaining washer notches. The retaining washer may be configured such that, following rotation of the retaining washer with respect to the inflator base to mount the inflator to the housing, the plurality of tabs engages the plurality of mounting portions such that the retaining washer is secured between the plurality of tabs and the housing.

In some embodiments, at least one of the plurality of mounting portions may comprise a stop projection configured to engage at least one of the plurality of tabs upon rotation of the retaining washer relative to the inflator base to prevent further rotation of the retaining washer relative to the inflator base. One or more of the plurality of tabs may have a different size and/or shape than at least one other tab of the plurality of tabs, one or more of the plurality of notches of the housing opening may have a different size and/or shape than at least one other notch of the plurality of notches of the housing opening such that the inflator base can only be inserted into the housing opening at a single, preconfigured rotational position.

Additionally, or alternatively, the housing may comprise a stop projection positioned adjacent to at least one of the plurality of notches. The housing stop projection may be configured to engage at least one of the plurality of tabs upon extending the inflator base at least partially through the housing opening such that at least a portion of the inflator base extends out of the housing opening to prevent rotation of the inflator base in at least one direction with respect to the housing.

In some embodiments, the housing opening may comprise a plurality of notches and the inflator base may comprise a plurality of tabs. The plurality of tabs may be configured to be received in the plurality of notches.

In some embodiments, an inflator base collar may be positioned about the inflator base. In some such embodiments, the plurality of tabs may be formed on the inflator base collar.

In another example of an embodiment of a vehicle airbag assembly, the assembly may comprise a housing comprising an opening. The opening may comprise a plurality of notches. The assembly may further comprise an inflator comprising an inflator base configured to be received in the opening. The inflator base may comprise a collar, such as a cylindrical collar in some embodiments. The inflator base may be configured to extend at least partially through the opening such that at least a portion of the inflator base extends out of the opening.

A plurality of tabs may be positioned about the inflator base and may be configured to be received in the plurality of notches. The assembly may be configured such that the plurality of tabs is configured to be misaligned with the plurality of notches by rotating the plurality of notches with respect to at least one component of the vehicle airbag assembly, such as a retaining washer, to prevent the inflator base from being withdrawn from the opening after the inflator base has been positioned such that at least a portion of the inflator base extends out of the opening.

In embodiments comprising a retaining washer, the retaining washer may comprise a retaining washer opening. The retaining washer may be configured to be positioned such that at least a portion of the inflator base extends through the retaining washer opening. In some embodiments, the retaining washer may comprise a plurality of retaining washer notches configured to allow the retaining washer to be positioned over the plurality of tabs. The retaining washer may further comprise a plurality of mounting portions positioned in between the plurality of retaining washer notches. The retaining washer may be configured such that, following rotation of the retaining washer with respect to the inflator base to mount the inflator to the housing, the plurality of tabs engages the plurality of mounting portions such that the retaining washer is secured between the plurality of tabs and the housing.

In some embodiments, one or more of the plurality of mounting portions may comprise a stop projection configured to engage at least one of the plurality of tabs upon rotation of the retaining washer relative to the inflator base to prevent further rotation of the retaining washer relative to the inflator base. The housing may also comprise a stop projection positioned adjacent to at least one of the plurality of notches of the opening. The stop projection of the housing may be configured to engage at least one of the plurality of tabs upon extending the inflator base at least partially through the opening such that at least a portion of the inflator base extends out of the opening to prevent rotation of the inflator base in at least one direction with respect to the housing.

In some embodiments, the inflator may comprise an initiator. The initiator may be at least partially housed within the inflator base.

In another example of a vehicle airbag assembly, the assembly may comprise an airbag module housing comprising a housing opening comprising a plurality of notches. The assembly may further comprise an inflator comprising an inflator collar configured to be received in the housing opening. The inflator collar may be configured to extend at least partially through the housing opening such that at least a portion of the inflator collar extends out of the housing opening. A plurality of tabs may be positioned about the inflator collar and may correspond with the plurality of notches such that the plurality of tabs is configured to be received in the plurality of notches.

The assembly may further comprise a retaining washer comprising a retaining washer opening, a plurality of retaining washer notches corresponding with the plurality of notches and the plurality of tabs, and a plurality of mounting portions positioned in between the plurality of retaining washer notches. The retaining washer may be configured such that, following rotation of the retaining washer with respect to the inflator collar to mount the inflator to the airbag module housing, the plurality of tabs engages the plurality of mounting portions such that at least a portion of the retaining washer is secured between the plurality of tabs and the airbag module housing to mount the inflator to the airbag module housing and to prevent the inflator collar from being withdrawn from the housing opening.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 4 depicts an example of an opening in a housing configured for receiving and engaging a base of an airbag inflator.

FIG. 5 depicts an embodiment of an airbag inflator base extending through the opening depicted in FIG. 4.

FIG. 6 depicts an embodiment of a retaining washer positioned over the airbag inflator base of FIG. 5 and against the housing of FIG. 4.

FIG. 7 depicts the interface between the retaining washer, airbag inflator base, and housing opening of FIGS. 4-6 following rotation of the retaining washer with respect to the airbag inflator base.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems, apparatus, and methods disclosed herein relate to coupling an airbag inflator with an airbag module housing, an adapter configured to be coupled with an airbag module housing, and/or another component of a vehicle airbag system. In some embodiments, various techniques and/or structures are disclosed that may be used to facilitate coupling an inflator comprising a base, such as a collar, with an airbag module housing, an adapter configured to be coupled with an airbag module housing, and/or another component of a vehicle airbag system. In some preferred embodiments, the inflator may comprise an inflator comprising a composite fiber overwrap. Such inflators are disclosed, for example, in U.S. Pat. No. 8,297,653 titled "Pyrotechnic Inflator with Composite Overwrap," the entire contents of which are hereby incorporated by reference herein.

Figure 1:
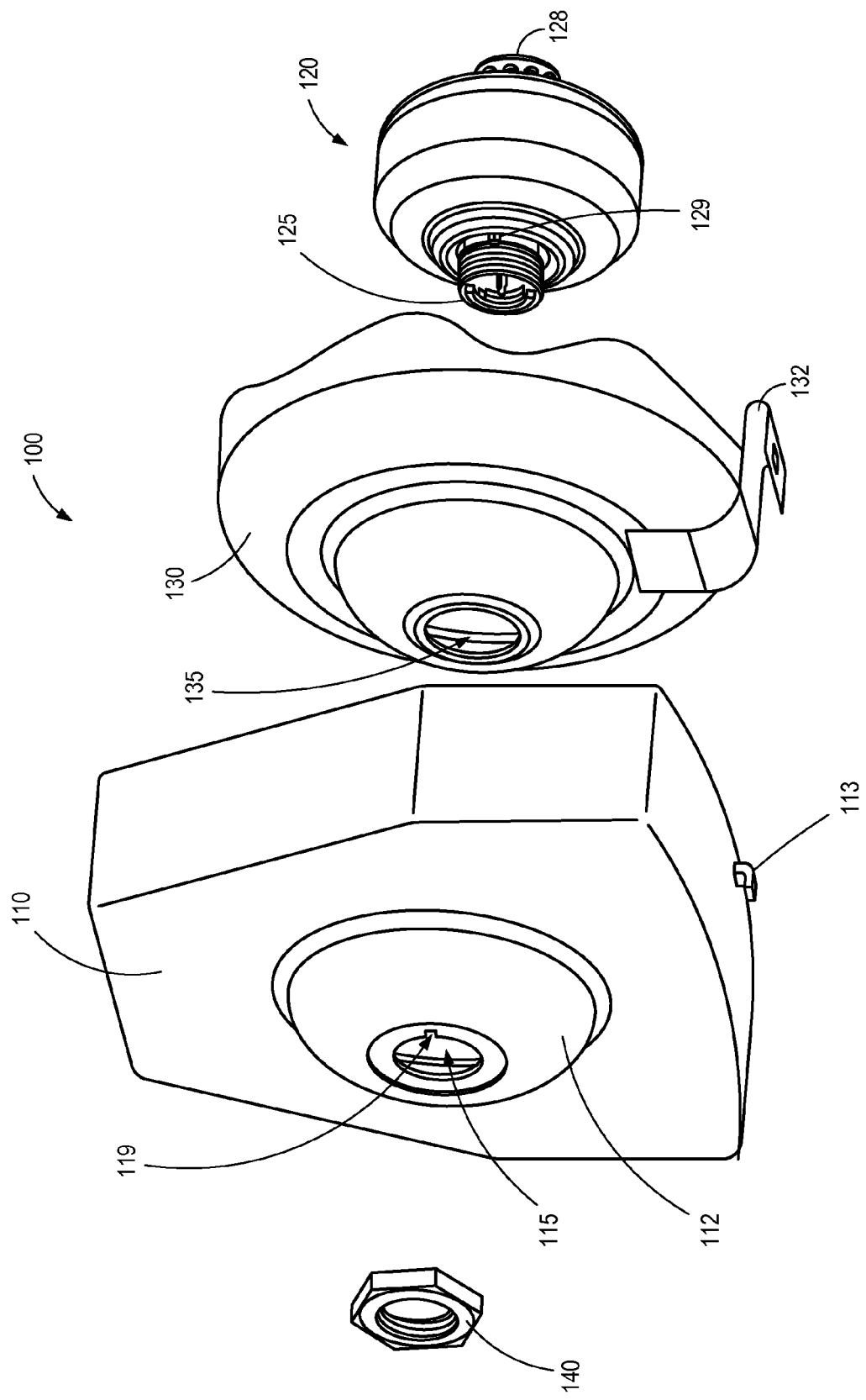
FIG. 1 depicts an exploded view of an airbag assembly for a vehicle according to one embodiment.

Additional details of certain embodiments and implementations will now be discussed in greater detail in connection with the accompanying figures. FIG. 1 depicts an embodiment of a vehicle airbag assembly 100. Vehicle airbag assembly 100 comprises a housing 110 comprising an opening 115. Housing 110 comprises an airbag module housing 110. However, other embodiments are contemplated in which the housing may instead comprise an adapter configured for coupling to an airbag module housing, as discussed in greater detail below.

Opening 115 is positioned on a recess 112 of housing 110. Recess 112 comprises a hemispherical shape that, as depicted in FIG. 1, at least substantially matches a shape of an inflator 120 that may also be part of airbag assembly 100. Recess 112, as also depicted in FIG. 1, protrudes from an exterior surface of housing 110. Of course, a wide variety of alternative embodiments are contemplated. For example, some embodiments may comprise a recess comprising a different shape, some embodiments may comprise a recess that does not protrude from an exterior surface of the housing, and some embodiments may lack such a recess entirely.

Inflator 120 comprises a base 125 at one end and a diffuser 128 at the opposite end. Base 125 comprises a collar configured to be received in the opening 115. Base 125 comprises an at least substantially cylindrical shape having an at least substantially circular cross-sectional shape. Base 125 is configured to extend at least partially through the opening 115 such that at least a portion of the base 125 extends out of opening 115 when airbag assembly 100 is fully assembled. In some embodiments, base 125 may comprise a metal collar. In some embodiments, base 125 may be configured to at least partially house an initiator within the base 125. In some such embodiments, base 125 may fully house an initiator therein. As such, it may be desirable to form collar base 125 from a rigid, protective material, such as a metal or metal composite material. However, other embodiments are contemplated in which at least a portion of collar base 125 comprises another material, such as a thermoplastic material.

Inflator 120 further comprises a poka yoke feature 129 comprising a flange configured to fit within a groove 119 formed within opening 115. By aligning flange 129 with groove 119, airbag assembly 100 may be configured such that inflator 120 may only be engaged with housing 110 at one rotational position (or, in some embodiments, a plurality of discrete rotational positions) relative to housing 110.

Vehicle airbag assembly 100 further comprises an airbag cushion 130, which may be positioned within housing 110. Inflator 120 may be positioned within airbag cushion 130. As shown in FIG. 1, airbag cushion 130 may comprise an opening 135 that may be aligned with opening 115 in housing 110 such that base 125 may extend through both opening 115 and opening 135 in an assembled configuration. As mentioned above, one or more poka yoke features, such as flange 129 and groove 119, may be provided to prevent engagement between inflator 120 and housing 110 at any position other than one or more particular, preconfigured rotational positions.

Vehicle airbag assembly 100 further comprises a retaining member 140. In the depicted embodiment, retaining member 140 comprises a threaded nut. Base 125 may also be threaded, such that threaded nut 140 may be configured to engage the threads on base 125 in order to secure inflator 120 with respect to housing 110 and to prevent base 125 from being withdrawn from opening 115 after base 125 has been positioned such that at least a portion of the base 125 extends out of opening 115.

As also depicted in FIG. 1, in some embodiments, a flap 132 may be coupled with airbag cushion 130. Flap 132 may be configured to be coupled with a hook 113 positioned on an exterior surface of housing 110. Hook 113 and flap 132 may be used to orient the airbag cushion 130 and/or other components of vehicle airbag assembly 100 in a desired position, such as a desired rotational configuration, with respect to other components of airbag assembly 100, and/or may also be used to facilitate desired deployment characteristics. In some embodiments, flap 132 may comprise a corresponding hook or other similar structure configured to engage hook 113.

Any of the inflators disclosed herein may further comprise an overwrap formed about at least a portion of a subassembly of the inflator. This overwrap may be provided in order to facilitate withstanding the high pressures generated within a combustion chamber of the inflator upon reaction of the pyrotechnic material contained therein. In some embodiments, the overwrap may comprise a composite of fibers comprising at least one of glass, basalt, and a resin matrix system.

In some embodiments, a shell member of the inflator comprising a metal, such as drawn steel or aluminum, for example, may comprise a thickness that is less than conventional pyrotechnic pressure vessel housings. For example, whereas conventional pyrotechnic pressure vessel metal housings are commonly 2 to 3 mm thick, by providing an overwrap, metal shell members having a thickness of less than 1 mm, and in some cases less than 0.5 mm, may be used. In alternative embodiments, the shell member may instead, or additionally, comprise a plastic material. In some embodiments, the shell member may be incapable of withstanding the pressure generated within the combustion chamber of the inflator upon reaction of the pyrotechnic material contained therein without the support provided by the overwrap.

In some embodiments, an end cap may be provided comprising a molded plastic with at least a portion of an initiator integrally molded therein. For example, in some embodiments, a glass-filled nylon, such as 33% glass-filled nylon 6, 12, may be used. One or more metal inserts may be included to improve the structural capability of the end cap if desired. In other embodiments, the end cap may comprise a cast or machined metal, such as aluminum, with the initiator crimped or molded in position therein. In some embodiments, the shell member and the end cap may be joined together by crimping the shell member over the end cap.

Figure 2:
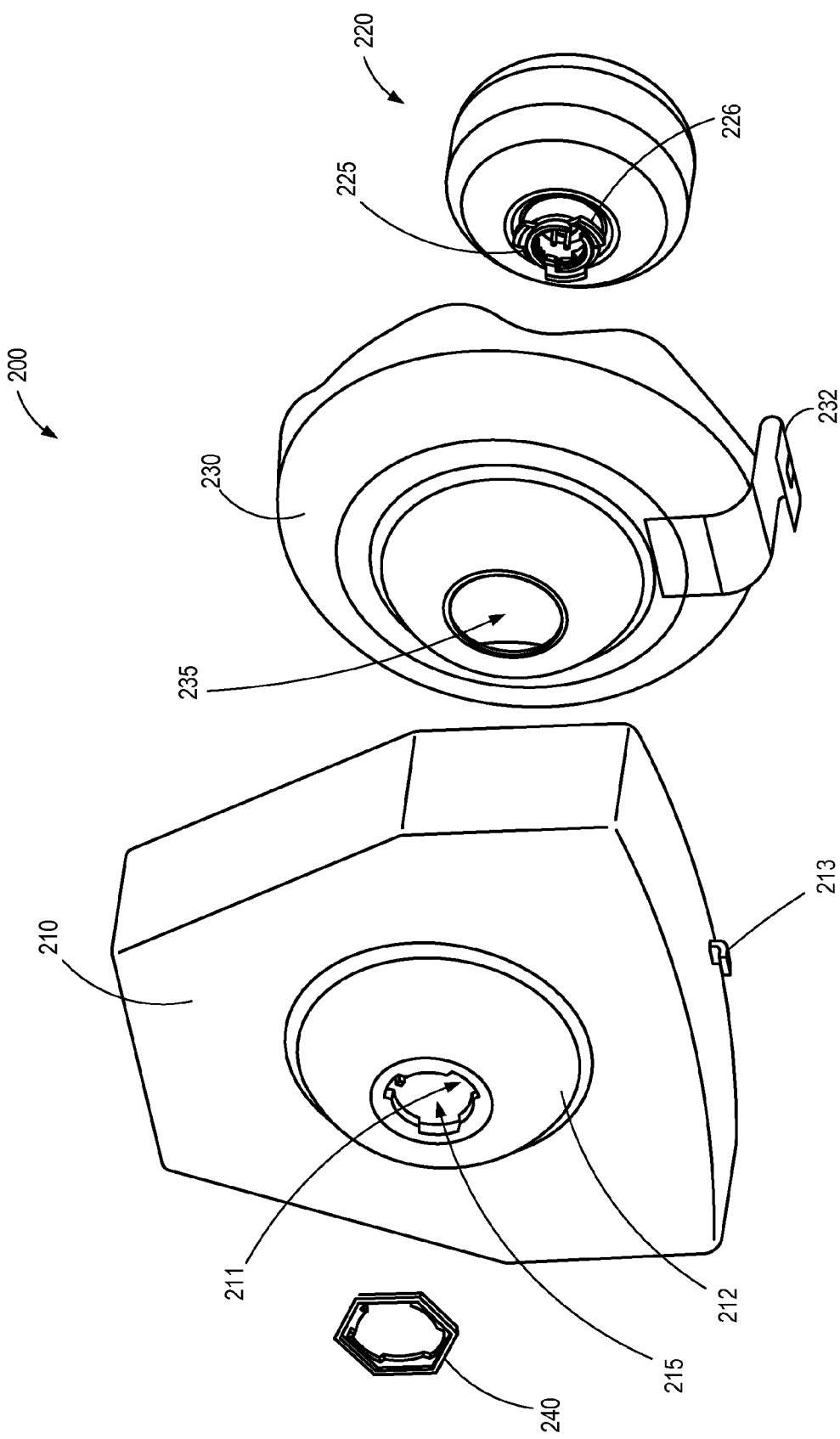
FIG. 2 depicts an exploded view of an alternative embodiment of an airbag assembly for a vehicle.

FIG. 2 depicts an alternative embodiment of a vehicle airbag assembly 200. Vehicle airbag assembly 200 comprises a housing 210 comprising an opening 215. Housing 210 comprises an airbag module housing 210. However, other embodiments are contemplated in which the housing may instead comprise an adapter configured for coupling the inflator to an airbag module housing.

Opening 215 is positioned on a recess 212 of housing 210. Recess 212 comprises a hemispherical shape that, as depicted in FIG. 2, at least substantially matches a shape of an inflator 220 that may also be part of airbag assembly 200. Recess 212, as also depicted in FIG. 2, protrudes from an exterior surface of housing 210. Of course, a wide variety of alternative embodiments are contemplated. For example, some embodiments may comprise a recess comprising a different shape, some embodiments may comprise a recess that does not protrude from an exterior surface of the housing, and some embodiments may lack such a recess entirely.

Inflator 220 comprises a base 225 at one end. Although not specifically depicted in FIG. 2, in some embodiments, a diffuser may be positioned at the opposite end, as shown in the embodiment of FIG. 1. Base 225 comprises a collar configured to be received in the opening 215. More particularly, base 225 is configured to extend at least partially through the opening 215 such that at least a portion of the base 225 extends out of opening 215 when airbag assembly 200 is fully assembled. In some embodiments, base 225 may comprise a metal collar. In some embodiments, base 225 may be configured to at least partially house an initiator within the base 225. In some such embodiments, base 225 may fully house an initiator therein.

Unlike inflator 120 of airbag assembly 100, base 225 of inflator 220 comprises a plurality of tabs 226 positioned about base 225. More particularly, tabs 226 are positioned about the periphery of base 225 and extend outwardly from the periphery of base 225. Tabs 226 are configured to be received in a corresponding plurality of notches 211 formed within opening 215 of housing 210.

Some embodiments may further, or alternatively, comprise a poka yoke feature. For example, in some embodiments, one or more of tabs 226 may comprise a different size and/or shape than one or more of the other tabs 226. Similarly, in some embodiments, one or more of the notches 211 may comprise a different size and/or shape that one or more of the other notches 211. The one or more different-sized notches 211 may correspond in shape/size with only the one or more different-sized tabs 226. In this manner, inflator 220 may be configured to only be inserted and engaged with housing 210 at one or more particular, preconfigured rotational positions.

Airbag assembly 200 further comprises a retaining member 240 comprising a washer. Retaining washer 240 comprises a central retaining washer opening. Retaining washer 240 is configured to be positioned such that inflator base 225 extends through the retaining washer opening and such that at least a portion of the retaining washer 240 contacts housing 210. Retaining washer 240 is further configured to be rotated with respect to the inflator base 225 to mount the inflator 220 to the housing 210 and to prevent the inflator base 225 from being withdrawn from the housing opening 215, as described in greater detail below in connection with FIGS. 4-7. Retaining washer 240 therefore facilitates a bayonet-style twist locking functionality between inflator 220 and housing 210.

In various embodiments disclosed herein, a plurality of tabs may be configured to be misaligned with a plurality of notches by rotating the plurality of notches with respect to at least one component of a vehicle airbag assembly to prevent an inflator base from being withdrawn from an opening in a housing after the inflator base has been positioned such that at least a portion of the inflator base extends out of the opening. In some embodiments, such as the embodiment of FIG. 2, the at least one component of the vehicle airbag assembly comprises retaining washer 240.

Airbag assembly 200 in FIG. 2 further comprises a flap 232 that may be coupled with airbag cushion 230. Flap 232 may be configured to be coupled with a hook 213 positioned on an exterior surface of housing 210.

Figure 3B:
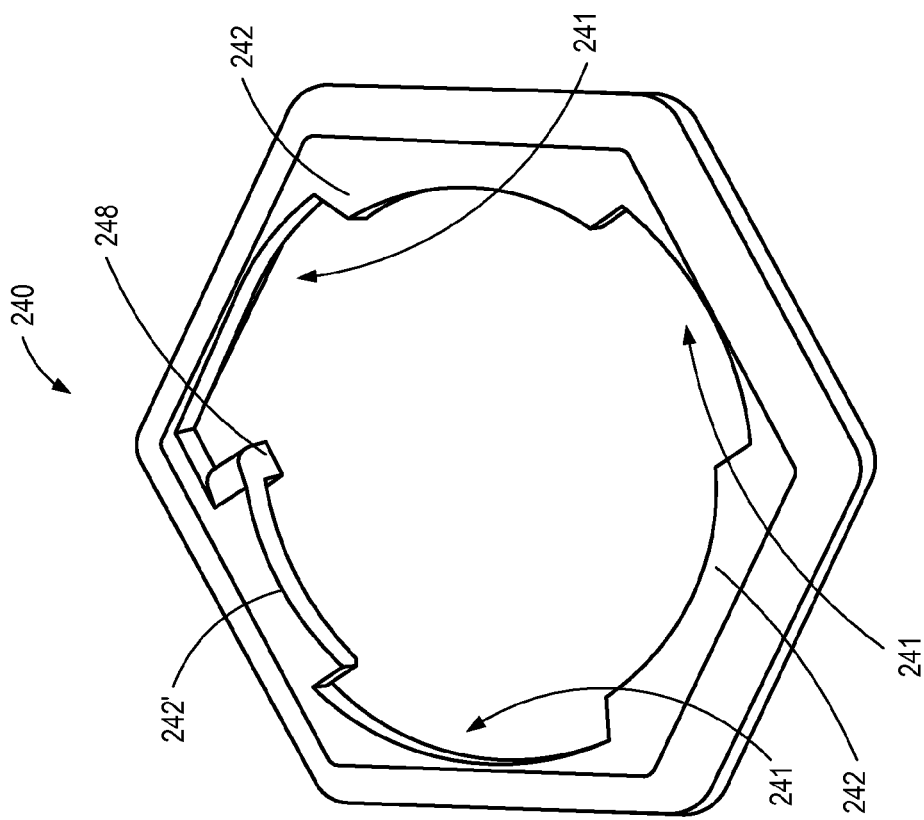
FIG. 3B depicts a bottom perspective view of the retaining washer of FIG. 3A.
Figure 3A:
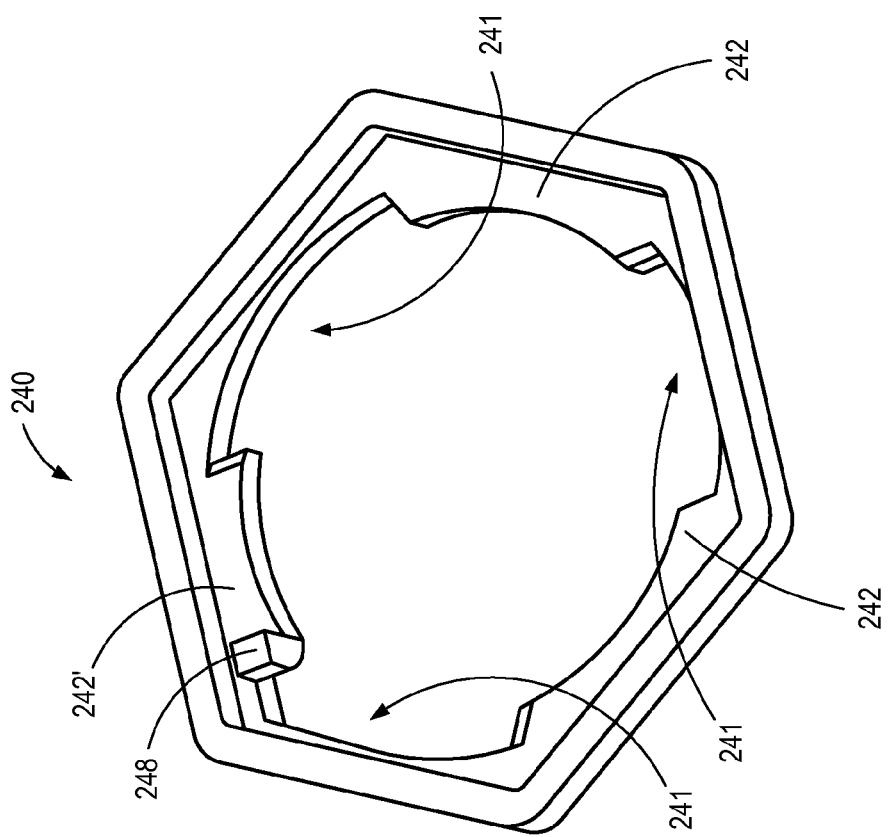
FIG. 3A depicts a top perspective view of a retaining washer configured for use in connection with certain embodiments of airbag assemblies.

FIGS. 3A and 3B depict upper and lower, respectively, perspective views of retaining washer 240. As shown in these figures, retaining washer 240 comprises a plurality of retaining washer notches 241 configured to allow the retaining washer 240 to be positioned over the plurality of tabs 226. Thus, preferably, the number, size, and shape of retaining washer notches 241 matches the number, size, and shape of tabs 226, along with the number, size, and shape of notches 211 in housing opening 215.

Retaining washer 240 may further comprise a plurality of mounting portions 242 positioned in between the plurality of retaining washer notches 241. The retaining washer 240 may be configured such that, following rotation of the retaining washer 240 with respect to the inflator base 225 to mount the inflator 220 to the housing 210, the plurality of tabs 226 engages the plurality of mounting portions 242 such that the retaining washer 240 is secured between the plurality of tabs 226 and the housing 210.

One or more of the plurality of mounting portions 242, such as mounting portion 242', may comprise a stop projection 248 configured to engage at least one of the plurality of tabs 226 upon rotation of the retaining washer 240 relative to the inflator base 225 to prevent further rotation of the retaining washer 240 relative to the inflator base 225. In some embodiments, as discussed below, a stop projection on the retaining washer, such as stop projection 248, may be configured such that it engages a tab on one side of the tab and a similar stop projection on the housing, such as stop projection 218, may be configured to engage the same tab on the opposite side of the tab with respect to the retaining washer stop projection 248.

FIGS. 4-7 depict a series of steps involved in using a retaining washer 240 to couple an inflator base 225 to a housing 210. FIG. 4 depicts a close-up view of opening 215 of housing 210. As previously mentioned, opening 215 may comprise a plurality of notches 211 that may correspond with the notches 241 in retaining washer 240 and/or the tabs 226 extending from base 225. A stop projection 218 may also be formed on housing 210 adjacent to one or more of the notches 211. Stop projection 218 may be configured to engage at least one of the plurality of tabs 226, as shown in FIGS. 6 and 7, upon extending the inflator base 225 at least partially through the housing opening 215 to prevent rotation of the inflator base 225 in at least one direction with respect to the housing 210.

As depicted in FIG. 5, base 225 may be at least partially extended through opening 215 by aligning tabs 226 with notches 211. As previously mentioned, base 225 may at least partially house and/or contain an initiator 227 in some embodiments. In some embodiments, one or more of the notches 226 may comprise a different size and/or shape to facilitate a desired orientation between housing 210 and base 225 during engagement. For example, in the embodiment depicted in FIG. 5, tab 226' is narrower than each of the other tabs 226. Thus, one of the notches 211 may similar comprise a narrower shape such that base 225 may only be inserted in opening 215 if narrow tab 226' is inserted within a corresponding narrower notch.

As shown in FIG. 6, retaining washer 240 may then be positioned over base 225 and against housing 210 by aligning the notches 241 in retaining washer 240 with tabs 226. If desired, one or more of the notches 241 may, like notches 211, comprise a different size and/or shape configured to engage with one or more particular tabs 226. Retaining washer 240 may then be rotated as indicated by the arrow in FIG. 6 to misalign the plurality of tabs 226 with the plurality of retaining washer notches 241. By doing so, the mounting portions 242 are positioned below the tabs 226 in between tabs 226 and housing 210 to secure the inflator 220 in place and prevent the inflator base 225 from being withdrawn from the housing opening 215. This secured configuration following the rotation of retaining washer 240 is depicted in FIG. 7.

Figure 8:
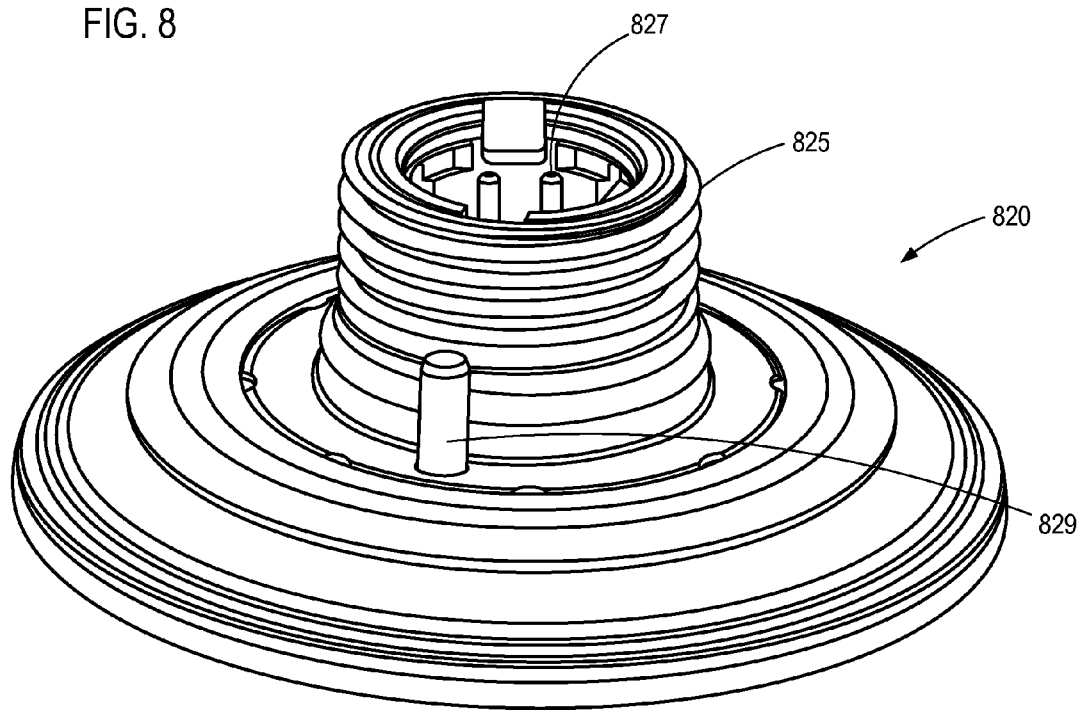
FIG. 8 depicts a perspective view of an alternative embodiment of an airbag inflator base.

FIG. 8 depicts an alternative embodiment of an inflator 820. Inflator 820 comprises an inflator base 825 and a post 829 configured to be received in a corresponding opening in a housing, such as an airbag module housing or an adapter for such a housing. As previously mentioned, inflator base 825 may at least partially encase an initiator 827 and may be threaded or, alternatively, may comprise any of the other features for facilitating coupling of inflator 820 with a housing.

Figure 9:
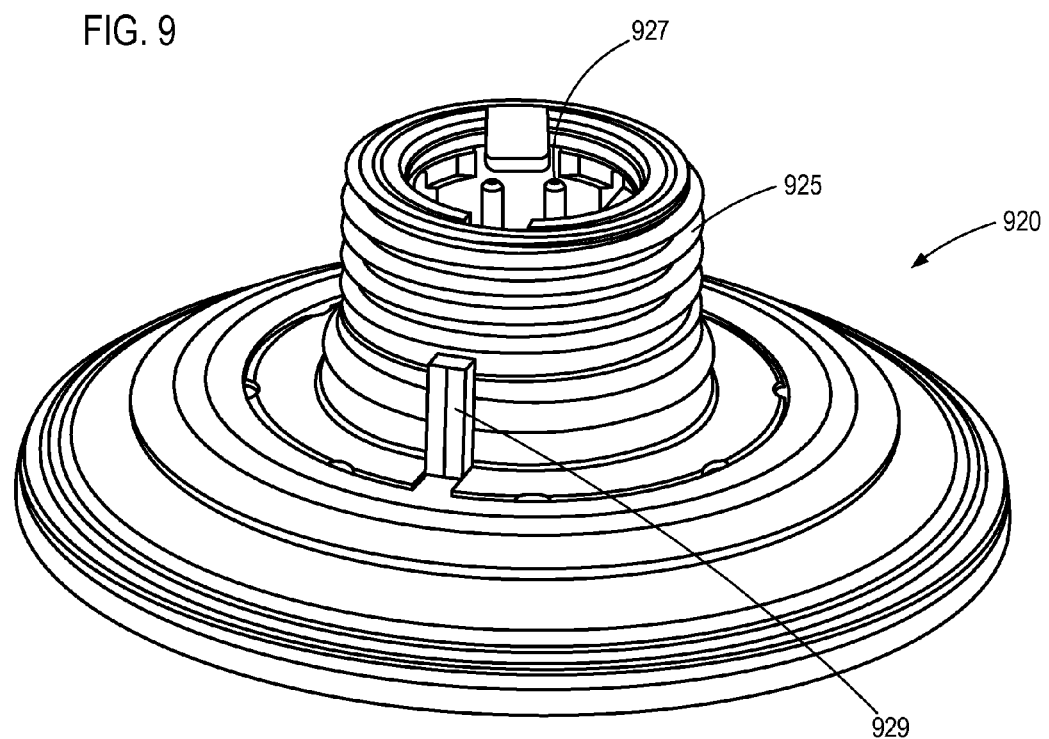
FIG. 9 depicts a perspective view of another alternative embodiment of an airbag inflator base.

FIG. 9 depicts another alternative embodiment of an inflator 920. Inflator 920 comprises an inflator base 925 and a tab 929 configured to be received in a corresponding opening in a housing, such as an airbag module housing or an adapter for such a housing. Tab 929 may, in some embodiments, initially be positioned within a base portion of inflator base 925, and may be bent up towards a central axis of inflator base 925, as depicted in FIG. 9. As previously mentioned, inflator base 925 may at least partially encase an initiator 927.

Post 829 and tab 929 are both examples of poka yoke features for facilitating coupling between an inflator and a housing in only one or more predetermined rotational configurations. In some embodiments, instead of fitting within a corresponding opening in a housing having a shape similar or identical to the post 829 or tab 929, a corresponding opening in a housing that is configured to receive the inflator base may comprise a cutout or groove that allows the post, tab, or other such poka yoke feature to pass therethrough, as depicted in the embodiment FIG. 1 for example.

Figure 10:
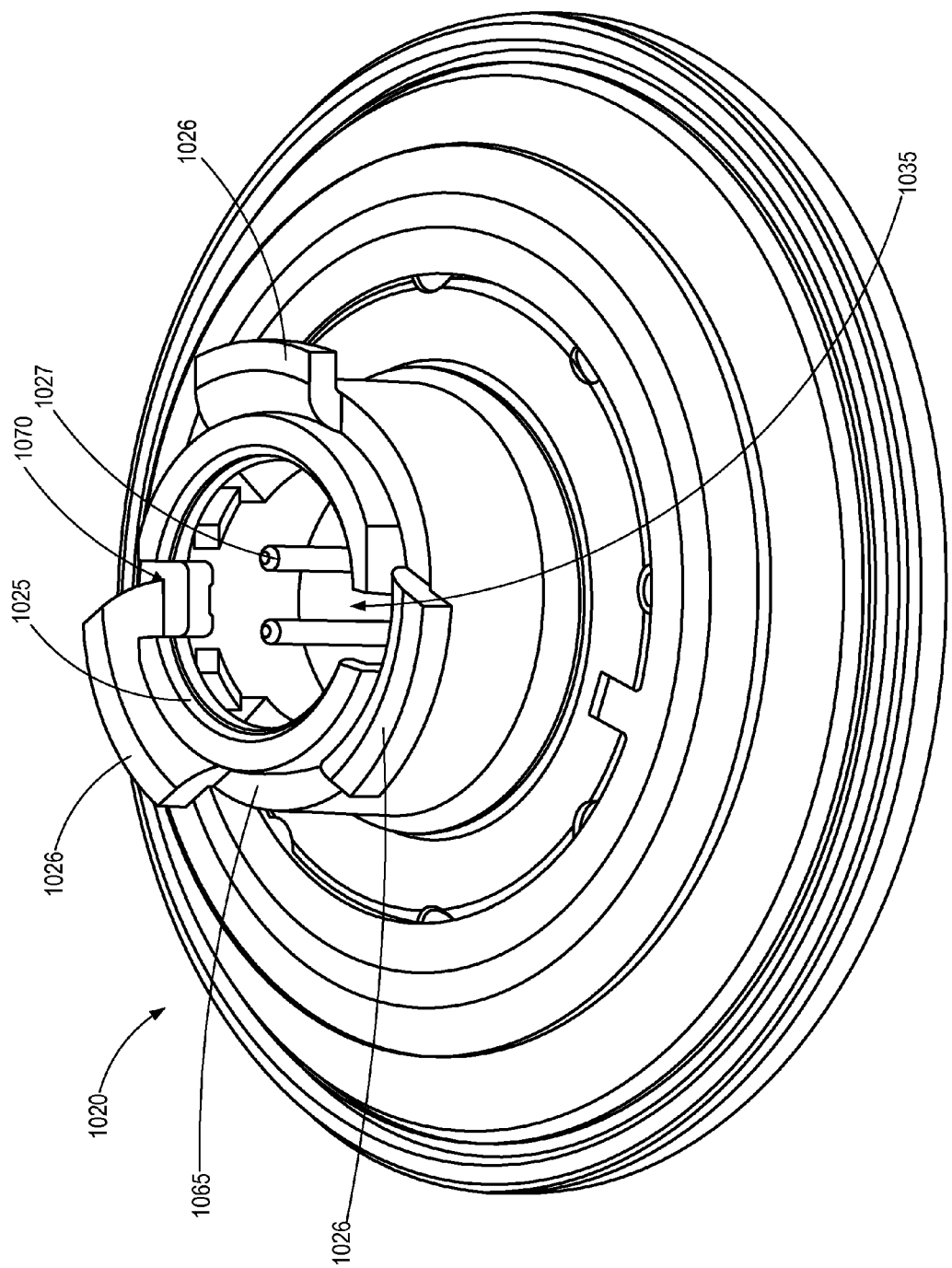
FIG. 10 depicts a perspective view of yet another alternative embodiment of an airbag inflator base comprising an inflator base collar positioned about the airbag inflator base.

FIG. 10 depicts yet another alternative embodiment of an inflator 1020 comprising an inflator base 1025. Inflator base 1025 comprises an inflator base collar 1065 positioned about inflator base 1025. A plurality of tabs 1026 is formed on inflator base collar 1065. Thus, instead of pre-forming the inflator base 1025 with tabs, providing a base collar 1065 may allow for retrofitting of an existing inflator base with such tabs, or may simply provide an alternative means for manufacturing an inflator base with such tabs.

In some embodiments, inflator base 1025 may comprise one or more slots, such as slots 1035 and 1070, formed in inflator base 1025. Such slots may be used to orient an initiator connector with inflator base 1025.

In some embodiments, inflator base 1025 may comprise a thermoplastic material or another non-metal material. Inflator base collar 1065, by contrast, may comprise a stronger material capable of withstanding greater forces during deployment, such as a metal material. By providing such an inflator base collar 1065 that may be positioned over inflator base 1025, the ability of the inflator to withstand such loading during deployment may be improved.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle airbag assembly, comprising:
    a housing comprising a housing opening, wherein the housing comprises an interior surface configured to receive an airbag cushion and an exterior surface opposite from the interior surface;
    an inflator comprising an inflator base configured to be received in the housing opening, wherein the inflator base is configured to extend at least partially through the housing opening such that at least a portion of the inflator base extends out of the housing opening and is positioned adjacent to the exterior surface of the housing, wherein the housing opening comprises a plurality of notches, wherein the inflator base comprises a plurality of tabs, and wherein the plurality of tabs is configured to be received in the plurality of notches; and
    a retaining washer comprising a retaining washer opening, wherein the retaining washer is configured to be positioned such that at least a portion of the inflator base extends through the retaining washer opening and such that at least a portion of the retaining washer contacts the exterior surface of the housing, wherein the retaining washer is configured to be rotated with respect to the inflator base to mount the inflator to the housing and to prevent the inflator base from being withdrawn from the housing opening, and wherein the retaining washer and the inflator base have a configuration such that rotation alone of the washer with respect to the inflator base mounts the inflator to the housing and prevents the inflator base from being withdrawn from the housing opening.

2. The vehicle airbag assembly of claim 1, further comprising an inflator base collar configured to be positioned about the inflator base, wherein the plurality of tabs is formed on the inflator base collar.

3. The vehicle airbag assembly of claim 1, wherein the retaining washer further comprises a plurality of retaining washer notches configured to allow the retaining washer to be positioned over the plurality of tabs.

4. The vehicle airbag assembly of claim 3, wherein the retaining washer further comprises a plurality of mounting portions positioned in between the plurality of retaining washer notches, wherein the retaining washer is configured such that, following rotation of the retaining washer with respect to the inflator base to mount the inflator to the housing, the plurality of tabs engages the plurality of mounting portions such that the retaining washer is secured between the plurality of tabs and the housing.

5. The vehicle airbag assembly of claim 4, wherein at least one of the plurality of mounting portions comprises a stop projection configured to engage at least one of the plurality of tabs upon rotation of the retaining washer relative to the inflator base to prevent further rotation of the retaining washer relative to the inflator base.

6. The vehicle airbag assembly of claim 1, wherein at least one of the plurality of tabs has a different size than at least one other tab of the plurality of tabs, and wherein at least one of the plurality of notches of the housing opening has a different size than at least one other notch of the plurality of notches of the housing opening such that the inflator base can only be inserted into the housing opening at a single, preconfigured rotational position.

7. The vehicle airbag assembly of claim 1, wherein the housing further comprises a stop projection positioned adjacent to at least one of the plurality of notches, wherein the stop projection is configured to engage at least one of the plurality of tabs upon extending the inflator base at least partially through the housing opening such that at least a portion of the inflator base extends out of the housing opening to prevent rotation of the inflator base in at least one direction with respect to the housing.

8. A vehicle airbag assembly, comprising:
    a housing comprising an opening, wherein the opening comprises a plurality of notches;
    an inflator comprising an inflator base configured to be received in the opening, wherein the inflator base comprises a collar extending from one end of the inflator, wherein the inflator comprises an initiator, wherein the initiator is at least partially housed within the collar, and wherein the collar is configured to extend at least partially through the opening such that at least a portion of the collar extends out of the opening; and
    a retaining member comprising a retaining member opening, wherein the retaining member is configured to be positioned such that at least a portion of the collar extends through the retaining member opening and such that at least a portion of the retaining member contacts an exterior surface of the housing, and wherein the retaining member is configured to be rotated with respect to the collar to mount the inflator to the housing and to prevent the collar from being withdrawn from the housing opening;

a plurality of tabs positioned about the collar, wherein the plurality of tabs is configured to be received in the plurality of notches, and wherein the plurality of tabs is configured to be misaligned with the plurality of notches by rotating the plurality of notches with respect to at least one component of the vehicle airbag assembly to prevent the collar from being withdrawn from the opening after the collar has been positioned such that at least a portion of the collar extends out of the opening.

9. The vehicle airbag assembly of claim 8, wherein the retaining member comprises a retaining washer comprising a retaining washer opening, wherein the retaining washer is configured to be positioned such that at least a portion of the collar extends through the retaining washer opening, and wherein the at least one component of the vehicle airbag assembly comprises the retaining washer.

10. The vehicle airbag assembly of claim 9, wherein the retaining washer further comprises a plurality of retaining washer notches configured to allow the retaining washer to be positioned over the plurality of tabs.

11. The vehicle airbag assembly of claim 10, wherein the retaining washer further comprises a plurality of mounting portions positioned in between the plurality of retaining washer notches, wherein the retaining washer is configured such that, following rotation of the retaining washer with respect to the collar to mount the inflator to the housing, the plurality of tabs engages the plurality of mounting portions such that the retaining washer is secured between the plurality of tabs and the housing.

12. The vehicle airbag assembly of claim 11, wherein at least one of the plurality of mounting portions comprises a stop projection configured to engage at least one of the plurality of tabs upon rotation of the retaining washer relative to the collar to prevent further rotation of the retaining washer relative to the collar.

13. The vehicle airbag assembly of claim 10, wherein the housing further comprises a housing stop projection positioned adjacent to at least one of the plurality of notches of the opening, wherein the housing stop projection is configured to engage at least one of the plurality of tabs upon extending the collar at least partially through the opening such that at least a portion of the collar extends out of the opening to prevent rotation of the collar in at least one direction with respect to the housing.

14. The vehicle airbag assembly of claim 8, wherein the collar comprises a cylindrical shape.

15. The vehicle airbag assembly of claim 8, wherein the housing comprises an airbag module housing.

16. The vehicle airbag assembly of claim 8, further comprising an inflator base collar configured to be positioned about the inflator base, wherein the plurality of tabs is formed on the inflator base collar.

17. A vehicle airbag assembly, comprising:
an airbag module housing comprising a housing opening, wherein the housing opening comprises a plurality of notches, wherein the airbag module housing comprises an interior surface configured to receive an airbag cushion and an exterior surface opposite from the interior surface;
an inflator comprising an inflator collar extending from the inflator, wherein the inflator collar is configured to be received in the housing opening, wherein the inflator collar at least partially houses an initiator, wherein the inflator collar is narrowed relative to the inflator, and wherein the inflator collar is configured to extend at least partially through the housing opening such that at least a portion of the inflator collar and the initiator extends out of the housing opening and is positioned adjacent to the exterior surface of the airbag module housing;
a plurality of tabs positioned about the inflator collar and corresponding with the plurality of notches, wherein the plurality of tabs is configured to be received in the plurality of notches; and
a retaining washer configured to be positioned to contact the exterior surface of the airbag module housing, comprising:
a retaining washer opening;
a plurality of retaining washer notches corresponding with the plurality of notches and the plurality of tabs; and
a plurality of mounting portions positioned in between the plurality of retaining washer notches, wherein the retaining washer is configured such that, following rotation of the retaining washer with respect to the inflator collar to mount the inflator to the airbag module housing, the plurality of tabs engages the plurality of mounting portions such that at least a portion of the retaining washer is secured between the plurality of tabs and the airbag module housing to mount the inflator to the airbag module housing and to prevent the inflator collar from being withdrawn from the housing opening.

* * * * *